(12) United States Patent
Marchart et al.

(10) Patent No.: US 6,279,989 B1
(45) Date of Patent: Aug. 28, 2001

(54) ROOF CONSTRUCTION FOR A VEHICLE

(75) Inventors: Horst Marchart, Stuttgart; Bodo Homann, Heimsheim, both of (DE)

(73) Assignee: Dr. Ing. h.e.F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 09/531,695

(22) Filed: Mar. 20, 2000

(30) Foreign Application Priority Data

Mar. 18, 1999 (DE) .............................................. 199 12 105

(51) Int. Cl.⁷ ...................................................... B60J 7/00
(52) U.S. Cl. ................... 296/197; 296/146.8; 296/210; 296/220.01
(58) Field of Search ..................... 296/216.04, 220.01, 296/196, 197, 210, 146.8, 103

(56) References Cited

U.S. PATENT DOCUMENTS

| | | |
|---|---|---|
| 2,122,712 | 7/1938 | Bishop . |
| 4,801,174 | 1/1989 | Hirshberg et al. ............... 296/106 Y |
| 4,852,938 | 8/1989 | Hirshberg et al. . |
| 5,540,478 * | 7/1996 | Schuch ............................ 296/197 X |
| 5,599,059 * | 2/1997 | Shann .............................. 296/216.04 |
| 6,129,413 * | 10/2000 | Klein .............................. 296/220.01 |

FOREIGN PATENT DOCUMENTS

| | | |
|---|---|---|
| 0 734 894 A2 | 10/1996 | (EP) . |
| 700730 * | 12/1953 | (GB) ................................ 296/197 |

OTHER PUBLICATIONS

Automotive Engineering, p. 80, "Roof modules: present and future", Apr. 2000.* jürgen Bayer et al., "Der Neue Porsche 911 Targa", ATZ Automobiltechnische Zeitschrift 97, Oct. 1995, No. 10, pp. 693–697.

* cited by examiner

*Primary Examiner*—Dennis H. Pedder
(74) *Attorney, Agent, or Firm*—Crowell & Moring LLP

(57) ABSTRACT

A roof construction for a vehicle has a large-surface roof opening which is surrounded by vehicle-body-side member sections and which can be closed by at least one movable forward roof section and an adjoining tail gate. The forward roof section is displaceable toward the rear of the vehicle and under the tail gate by way of laterally arranged vehicle rails extending in the longitudinal direction of the vehicle and by way of driving devices. In order to simplify and shorten assembly work at an assembly line, the at least one movable roof section, the assigned guide rails, the tail gate and the driving devices are accommodated by a surrounding carrying frame and, together with the carrying frame, form a prefabricated module. Together with the insertion of a surrounding sealing element, the prefabricated module is connected with the vehicle-body-side member sections.

20 Claims, 5 Drawing Sheets

ROOF CONSTRUCTION FOR A VEHICLE

This application claims the priority of German application 199 12 105.2, filed Mar. 18, 1999, the disclosure of which is expressly incorporated by reference herein.

BACKGROUND AND SUMMARY OF THE INVENTION

The present invention relates to a particular roof construction for a vehicle having a large-surface roof opening surrounded by body-side member sections. At least one movable forward roof section and an adjoining tail gate, by which the opening can be closed, are provided. The at least one movable forward roof section is rearwardly displaceable under the tail gate by driving devices and by way of laterally arranged guide rails extending in the longitudinal direction of the vehicle.

U.S. Pat. No. 4,801,174 discloses a roof construction for a vehicle which has a large-surface roof opening surrounded by body-side member sections. The roof opening can be closed by at least one movable forward roof section and a tail gate which adjoins the roof section and is provided with a rear window. The movable forward roof section is displaceable toward the rear, under the tail gate, by way of laterally arranged and longitudinally extending guide rails. In this roof construction, the movable forward roof section, the guide rails, and the driving devices required therefor, as well as the tail gate, are connected with the body structure in a plurality of successive operations directly on the assembly line, which results in a time-consuming assembly. In addition, testing of the operation and the tightness of the roof construction cannot take place before the vehicle is finished.

It is, therefore, an object of the invention to take such measures on a roof construction for a vehicle that assembly work at the assembly line can be further simplified and shortened.

In order to achieve this object, a roof construction is suggested which has the at least one movable roof section, the guide rails, the tail gate and the driving devices accommodated by a surrounding carrying frame. Together with the surrounding carrying frame, these elements form a prefabricated module which is connected with the vehicle-body-side member sections by way of a surrounding sealing element. Advantageous further developments of the invention are also reflected in the claims.

By combining the movable forward roof section with the assigned guide rails, the driving devices, and the tail gate to form a prefabricated module accommodated in a carrying frame, a complete roof construction can be produced outside of the assembly line, and the roof construction can be tested with respect to operation and tightness and can be mounted, in a rapid and simple manner, at the place of manufacture.

The prefabricated module is moved, in a simple manner, through the windshield opening of the vehicle into the occupant compartment and is then inserted from below by way of centering pins into the roof opening. The carrying frame is connected by way of screwed connections with member sections surrounding the roof opening.

Mounting the module from below has the advantage of better utilizing the space in the lateral member sections (roof members). As a result, a larger clear opening is obtained in the transverse direction of the vehicle.

In addition, at high vehicle speeds, as a result of a vacuum acting on the top side of the vehicle, the contact pressure of the seals is increased, and the noise level in the vehicle occupant compartment is positively influenced.

The hinges and pneumatic springs for the tail gate can easily be mounted on the carrying frame of the module outside the assembly line.

The driving devices are arranged on a rearward, transversely extending section of the carrying frame. In addition, the carrying frame carries the two lateral longitudinally extending guide rails for the movable forward roof section.

In the closed position, the forward roof section and the tail gate form a large-area glass surface which is flush with the shell. The lateral guide rails, together with forward and central water collecting strips connected with the carrying frame, form a surrounding frame for draining water. A surrounding sealing strip is arranged between sections of the vehicle body and the carrying frame which point in the same direction, so that a tight connection is achieved between the module and the vehicle body.

An embodiment of the invention will now be described by way of reference to the drawing figures.

DETAILED DESCRIPTION OF THE DRAWING FIGURES

Figure 1:
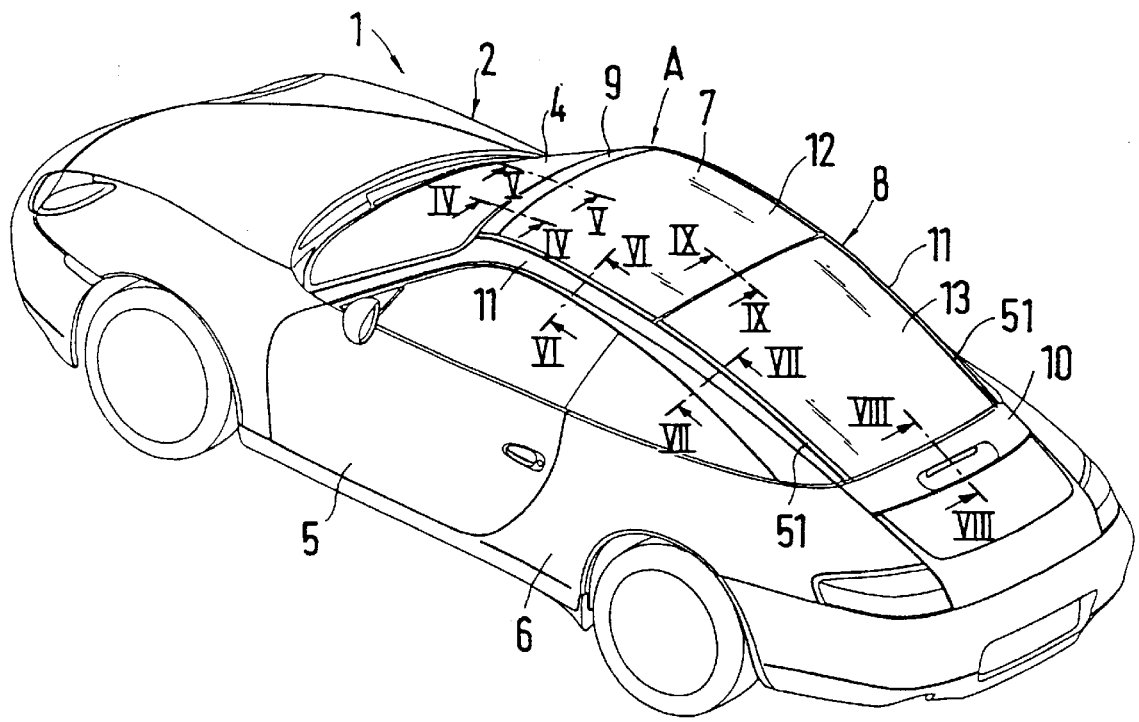
FIG. 1 is a perspective view, diagonally from behind, of a vehicle with a large-surface roof opening and an inserted roof construction in the closed position.

The vehicle 1 illustrated in FIG. 1 is a passenger car and has a vehicle body 2 which is composed of a windshield 4 accommodated in a windshield frame 3, side doors 5, rearward side parts 6, and a roof construction 8 inserted into a large-surface roof opening 7. The roof opening 7 is surrounded by vehicle-body-side member sections 9, 10, and 11; specifically, the opening is surrounded in the front by the upper transversely extending section 9 of the windshield frame 3, in the rear by a rear cross member 10, and on both longitudinal sides by laterally exterior vehicle-body-side roof members 11. According to FIG. 1, the roof construction 8 comprises at least one movable forward roof section 12 and an adjoining swivellable tail gate 13. In the closed position A of the roof construction 8, the roof section 12 and the tail gate 13 extend flush with respect to one another, with respect to the shell, and with respect to the adjoining exterior sides of the member sections 9, 10, and 11, and form a large-area glass surface.

Figure 4:
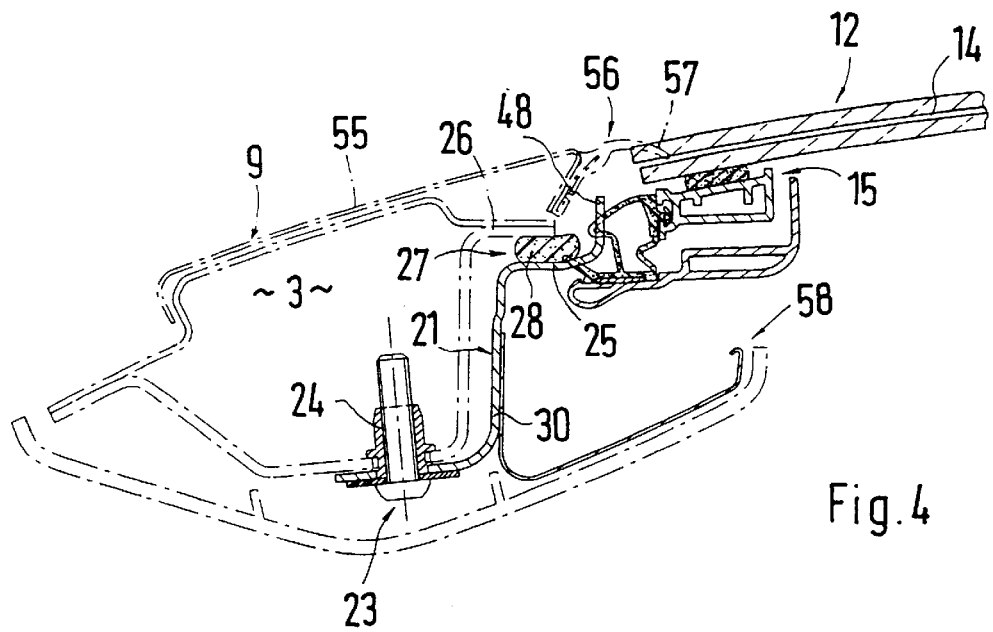
FIG. 4 is an enlarged sectional view along line IV—IV of FIG. 1.

The forward roof section 12 comprises an inner glass pane 14 and an inner surrounding frame 15. The glass pane 14 is connected with the frame 15 by gluing (FIG. 4).

Figure 2:
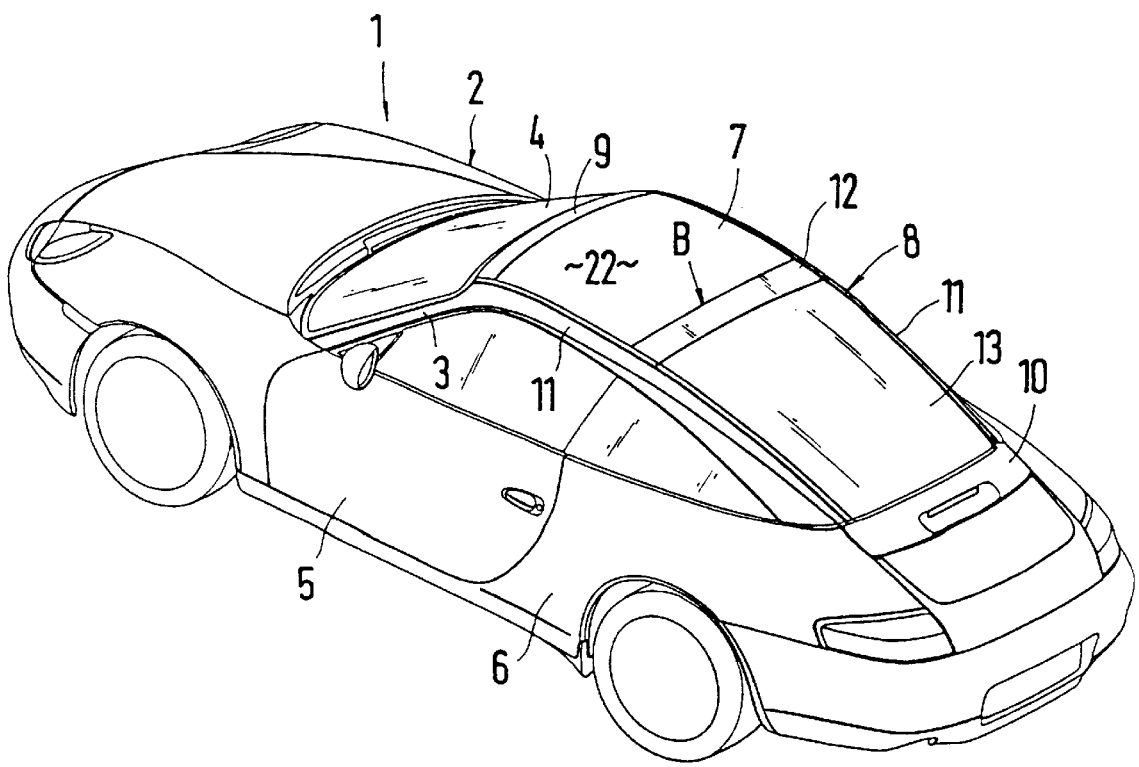
FIG. 2 is a perspective view, similar to FIG. 1, in which the movable forward roof section is pushed almost completely to the rear under the tail gate of the roof construction.

Referring to FIGS. 1 and 2, starting from the closed position A illustrated in FIG. 1, the forward roof section 12 can be displaced by way of a translatory movement toward the rear under the swivellable tail gate 13 and vice versa. The roof section 12 can be pushed partially or almost completely into an opening position B under the tail gate 13. For the adjusting movement of the forward roof section 12, guide rails 16 are arranged on both longitudinal sides of the roof opening 7 and extend in the longitudinal direction of the vehicle. Sliding elements of the movable roof section 12, which are not shown in detail, are guided in the guide rails 15 in a displaceable manner.

The longitudinal displacement of the forward roof section 12 takes place by way of mechanical and/or electric driving devices 17. The roof construction 8 can also comprise several movable roof sections 12 which are arranged behind one another (not shown in detail).

Figure 7:
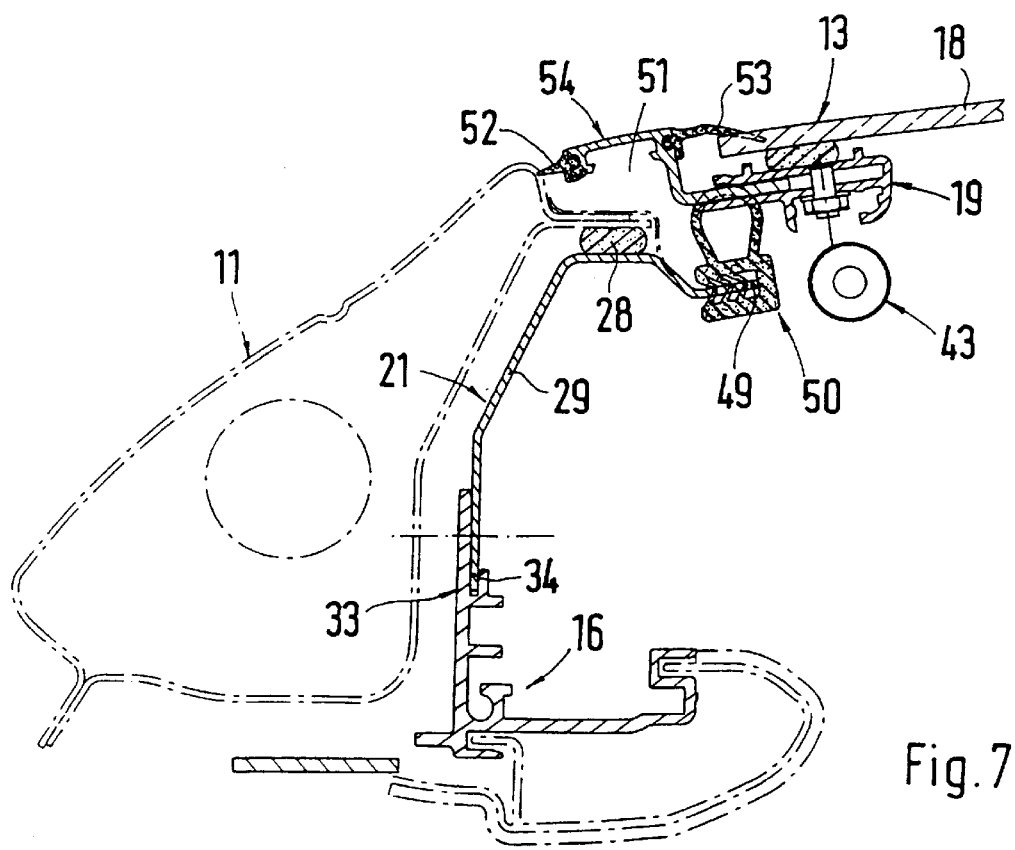
FIG. 7 is an enlarged sectional view along line VII—VII of FIG. 1.

FIG. 7 shows the tail gate 13 as composed of an exterior rear window 18 and a surrounding interior frame 19. The tail gate 13 can be swivelled from the closed position A, illustrated in FIG. 1, by way of intermediate positions C into an opening position, not shown in detail, and vice versa. The rear window 18 is connected with the frame 19 by gluing.

When the forward roof section 12 is at least partially pushed back, adjacent to the upper transversely extending section 9 of the windshield frame 3, a wind deflector, which is not shown in detail, is moved automatically from a retracted inoperative position to an extended operative position in order to avoid rumbling noises in the vehicle occupant compartment 22 during driving.

According to the invention, the at least one movable roof section 12 with the assigned guide rails 16 and driving devices 17 and the rearwardly adjoining swivellable tail gate 13 form a prefabricated module 20 which is sealingly connected with the vehicle-body-side member sections 9, 10 and 11. The roof section 12, the guide rails 16, the driving devices 17, and the tail gate 13 are accommodated by a surrounding carrying frame 21. During mounting, the prefabricated module is moved, from the front, through the windshield opening of the vehicle 1 into the vehicle occupant compartment 22. The module is then inserted from below into the roof opening 7, and is fastened to the vehicle-body-side member sections 9, 10, and 11. Fastening takes place, for example, by way of several fastening screws 23 provided locally along the circumference of the roof opening 7.

The fastening screws 23 are screwed from the vehicle occupant compartment 22 into nuts 24 arranged on the vehicle body side (FIG. 4).

Between identically directed flanges 25, 26 of the vehicle-body-side member sections 9, 10, and 11 and of the carrying frame 21, a surrounding sealing element 27 is provided.

The sealing element 27 is formed, for example, by a closed strip 28 which is premounted on the top side of a flange 25 of the carrying frame 21. The sealing element 27 extends between the top side of the flange 25 and the bottom side of a flange 26 of the vehicle-body-side member sections 9, 10, and 11 which bounds the roof opening 7.

The surrounding carrying frame 21 is composed of several differently profiled sheet metal stampings, which are connected with one another by welding. The frame comprises lateral, longitudinally extending frame parts 29, a forward transversely extending frame part 30, a rearward transversely extending frame part 31 and, in the common connection area of the roof section 12 and the tail gate 13, an additional profiled transverse web 32. A sealing profile 59 is fitted on the upper edge of the transverse web 32 and sealingly interacts with the two adjoining components 12 and 13.

The guide rails 16 for the roof section 12, which is movable in the longitudinal direction, extend along the two lateral frame parts 29 of the carrying frame 21 and are fixedly connected with the lateral frame parts 29. This can take place by riveting, screwing, welding or the like.

Figure 6:
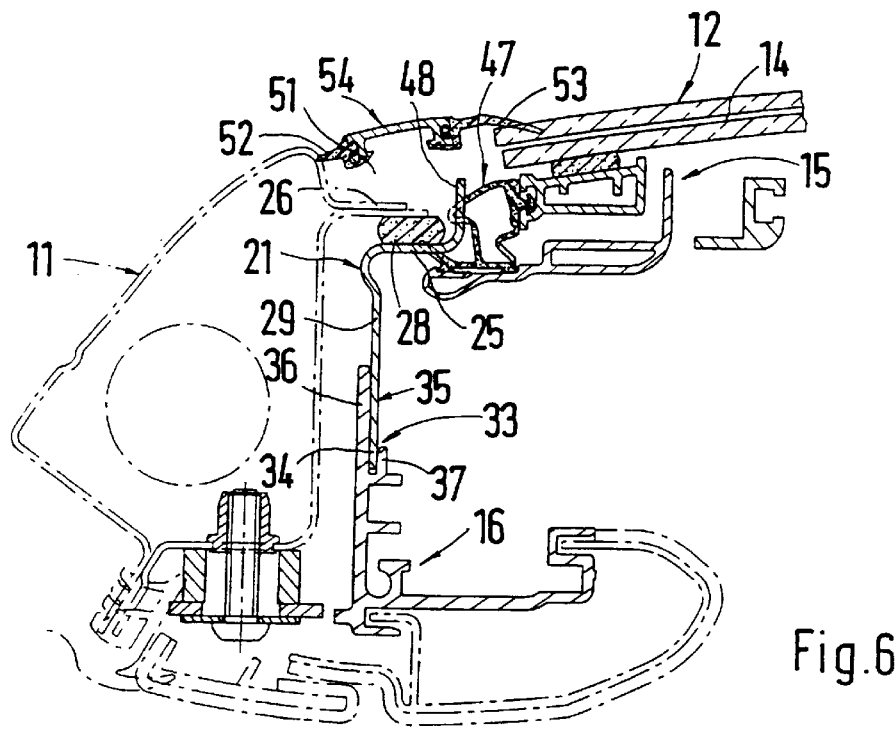
FIG. 6 is an enlarged sectional view along line VI—VI of FIG. 1.

According to FIGS. 6 and 7, an approximately U-shaped upwardly open receiving section 33 of the guide rail 16 reaches around the free lower end 34 of the upright legs 35 of the lateral frame parts 29. An outer web 36 of the U-shaped receiving section 33 has a greater height than the inner web 37. The profiling of the carrying frame 21 is adapted, at least in the forward transversely extending area and on both longitudinal sides, to the shape of the adjoining inner sheet metal part of the respective member section 9 and 11 and extends, at least in areas, approximately parallel to the latter.

The tail gate 13 is connected on both upper laterally exterior edge areas by way of hinges 38 with the lateral frame parts 29 of the carrying frame 21.

In the embodiment shown, each hinge 38 is formed by an unhinging four-bar hinge. Each four-bar hinge comprises a first holding plate 39 fastened to the lateral frame part 29, a second holding plate 40 connected with the frame 19 of the tail gate 13, and two control arms 41, 42 arranged in the manner of a four-bar arrangement. Each control arm 41, 42 is, on one side, hinged to the first holding plate 39 and, on the other side, hinged to the second holding plate 40. The control arm 41 situated in front has a shorter length than the control arm 42 situated in the rear.

A pneumatic spring 43 is provided at least on a longitudinal side of the tail gate 13 to assist the opening movement of the tail gate 13. Pneumatic springs 43 are preferably arranged on both longitudinal sides of the tail gate 13.

Figure 3:
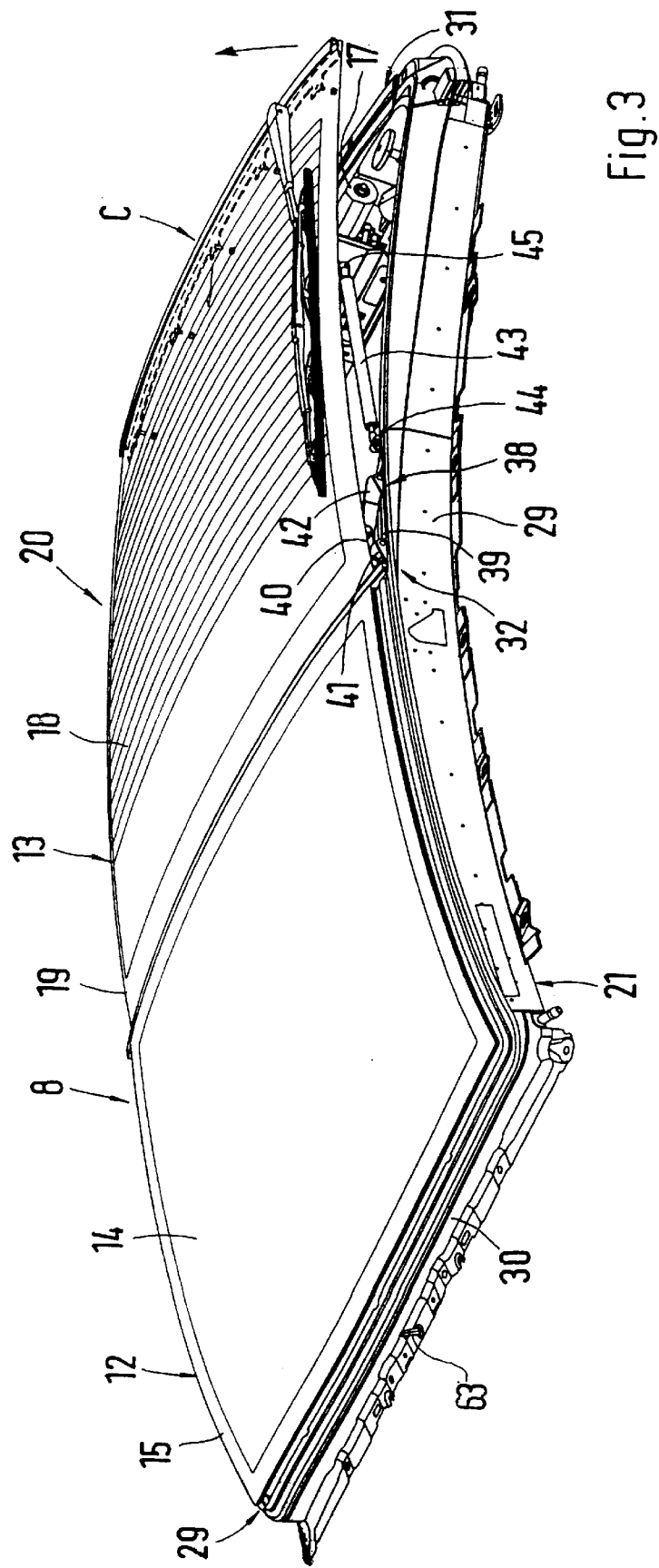
FIG. 3 is a perspective view, diagonally from the front, of the prefabricated module which can be inserted into the roof opening and showing the tail gate in a lifted intermediate position.

One end 44 of each pneumatic spring is connected to the lateral frame part 29 of the carrying frame 21 and the other end 45 is connected to the interior side of the tail gate 13 (FIG. 3).

On the rearward, transversely extending frame part 31 of the carrying frame 21, a portion of a closing device 46 for the tail gate 13 is provided. In this case, the closing device 46 may be equipped with a pull-tight device.

Figure 5:
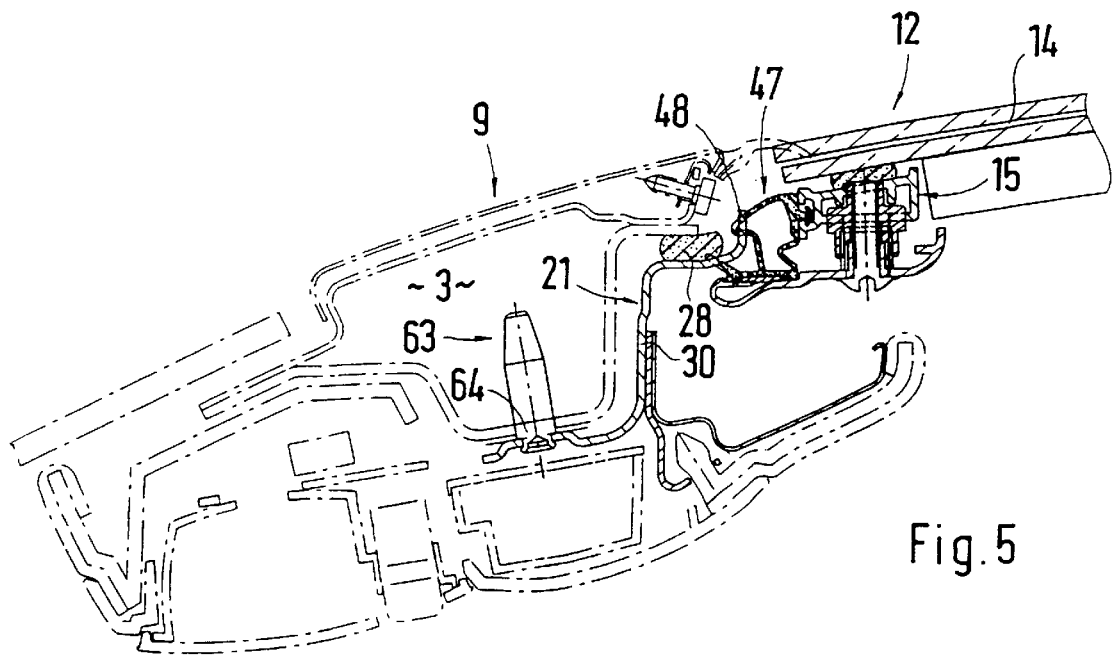
FIG. 5 is an enlarged sectional view along line V—V of FIG. 1.

A sealing body 47 is arranged on the interior frame 15 of the movable roof section 12. When the forward roof section 12 is closed, the sealing body interacts with flanges 25 and 48 of the carrying frame 21 (FIG. 5).

Figure 8:
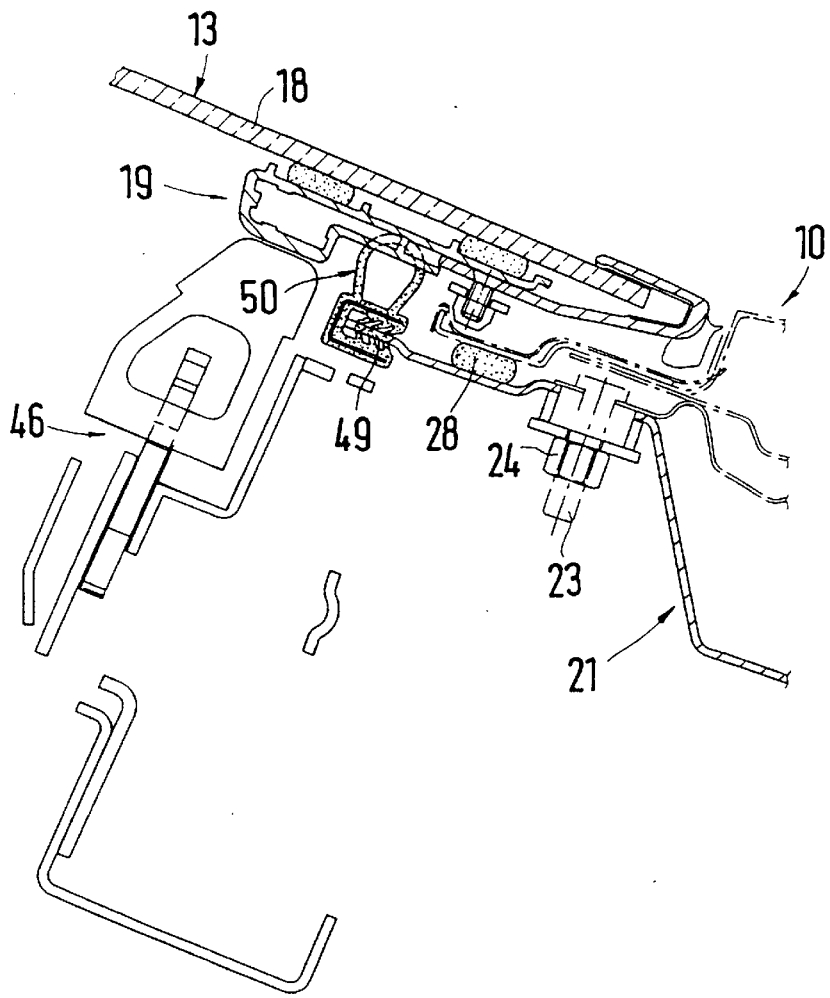
FIG. 8 is an enlarged sectional view along line VIII—VIII of FIG. 1.
Figure 9:
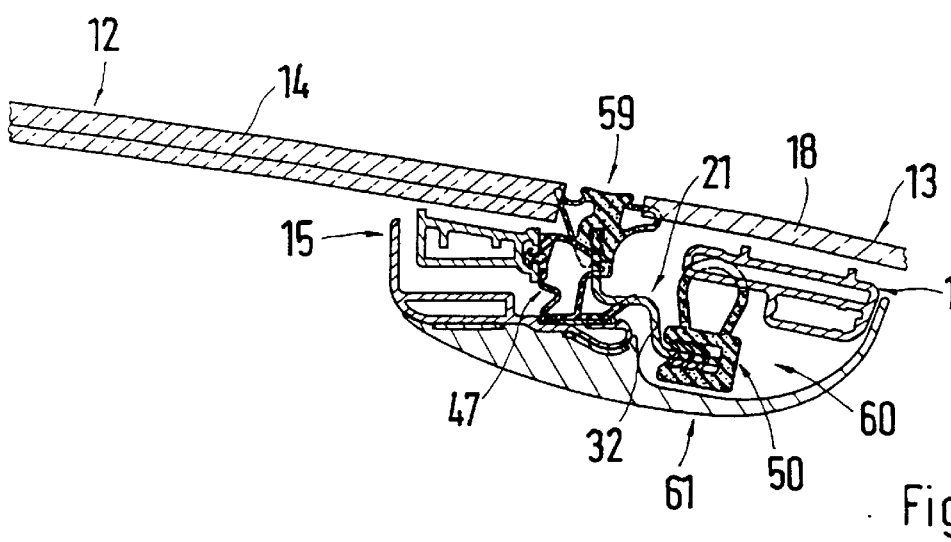
FIG. 9 is an enlarged sectional view along line IX—IX of FIG. 1.

In the area of the tail gate 13, another sealing body 50 is fitted onto the upper free end 49 of the carrying frame 21. The "hose" profile of this sealing body 50, when the tail gate 13 is closed, interacts in a sealing manner with the interior frame 19 of the tail gate 13 (FIGS. 7 and 8).

The two laterally exterior, longitudinally extending roof channels 51 between the movable roof section 12 or the tail gate 13 and the member section 11 situated farther on the outside are, in each case, covered by a cover strip 54 provided on both sides with sealing lips 52, 53 (FIGS. 6 and 7).

In the forward, transversely extending area, a lip-type sealing element 56 is disposed on a cover panel 55 of the upper windshield frame 9. The free end of the sealing lip 57 is supported on the exterior side of the forward edge of the movable roof section 12 (FIG. 4).

In addition, a groove-shaped water collecting strip 58 is mounted on the forward, transversely extending frame part 30 of the carrying frame 21. On the two longitudinal sides of the roof opening 7, the guide rails 16 have the function of water catching strips.

In the area of the transverse web 32, a trough-shaped section 60 of a strip 61 forms a transversely extending water catching strip. At the forward and rearward end areas of the carrying frame 21, connection fittings for draining water are provided on each of the two longitudinal sides.

In order to facilitate mounting when inserting the module 20, at least one upward-projecting centering pin 63 is arranged on the forward, transversely extending frame part 30 of the carrying frame 21. This centering pin 63 is inserted into a corresponding opening 64 of the member section 9 (FIG. 5).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Roof construction for a vehicle comprising:
   vehicle-body-side member sections surrounding a large-surface roof opening, and
   at least one movable forward roof section and an adjoining tail gate by which said opening can be closed, the at least one movable forward roof section being rearwardly displaceable under the tail gate by way of laterally arranged guide rails extending in the longitudinal direction of the vehicle and driving devices,
   wherein the at least one movable roof section, the guide rails, the tail gate and the driving devices are accommodated by a surrounding carrying frame and, together with the surrounding carrying frame, form a prefabricated module which is connected with the vehicle-body-side member sections by way of a surrounding sealing element.

2. Roof construction according to claim 1, wherein the prefabricated module can be introduced through a windshield opening of the vehicle into a vehicle occupant compartment and can be inserted from below into the roof opening.

3. Roof construction according to claim 1, wherein the carrying frame is connected locally by way of screwed connections with the member sections surrounding the roof opening.

4. Roof construction according to claim 1, wherein the sealing element is formed by a surrounding strip which is premounted on a top side of a flange of the carrying frame, the strip extending between the top side of the flange and a bottom side of a flange of the vehicle-body-side member sections which bounds the roof opening and extends in the same direction.

5. Roof construction according to claim 1, wherein the surrounding carrying frame includes two lateral frame parts, both of the lateral frame parts of the carrying frame are connected with one another in a common connection area of the movable roof section and the tail gate by a profiled transverse web, and a sealing body is provided on a top side of the transverse web.

6. Roof construction according to claim 1, and further comprising hinges connecting the tail gate on both upper laterally exterior edge areas with lateral frame parts of the carrying frame.

7. Roof construction according to claim 6, wherein each of said hinges is constructed as a unhinging four-bar hinge.

8. Roof construction according to claim 6, and further comprising a pneumatic spring, which assists in opening the tail gate, provided at least on a longitudinal side of the tail gate, one end of the pneumatic spring being rotatably linked to one of the lateral frame parts of the carrying frame and the other end of the pneumatic spring being rotatably linked to an interior side of the tail gate.

9. Roof construction according to claim 1, and further comprising a closing device for the tail gate having a portion which is provided on a rearward, transversely extending frame part of the carrying frame.

10. Roof construction according to claim 9, wherein the closing device is provided with a pull-tight device.

11. Roof construction according to claim 2, wherein the carrying frame is connected locally by way of screwed connections with the member sections surrounding the roof opening.

12. Roof construction according to claim 11, wherein the surrounding carrying frame includes two lateral frame parts, both of the lateral frame parts of the carrying frame are connected with one another in a common connection area of the movable roof section and the tail gate by a profiled transverse web, and a sealing body is provided on a top side of the transverse web.

13. Roof construction according to claim 2, wherein the surrounding carrying frame includes two lateral frame parts, both of the lateral frame parts of the carrying frame are connected with one another in a common connection area of the movable roof section and the tail gate by a profiled transverse web, and a sealing body is provided on a top side of the transverse web.

14. Roof construction according to claim 3, wherein the surrounding carrying frame includes two lateral frame parts, both of the lateral frame parts of the carrying frame are connected with one another in a common connection area of the movable roof section and the tail gate by a profiled transverse web, and a sealing body is provided on a top side of the transverse web.

15. Roof construction according to claim 2, and further comprising hinges connecting the tail gate on both upper laterally exterior edge areas with lateral frame parts of the carrying frame.

16. Roof construction according to claim 15, wherein each of said hinges is constructed as a unhinging four-bar hinge.

17. Roof construction according to claim 3, and further comprising hinges connecting the tail gate on both upper laterally exterior edge areas with lateral frame parts of the carrying frame.

18. Roof construction according to claim 17, wherein each of said hinges is constructed as a unhinging four-bar hinge.

19. Roof construction according to claim 2, and further comprising a closing device for the tail gate having a portion which is provided on a rearward, transversely extending frame part of the carrying frame.

20. Roof construction according to claim 3, and further comprising a closing device for the tail gate having a portion which is provided on a rearward, transversely extending frame part of the carrying frame.

* * * * *